US010550820B2

(12) United States Patent
Tozzi et al.

(10) Patent No.: US 10,550,820 B2
(45) Date of Patent: Feb. 4, 2020

(54) TIME-VARYING SPARK CURRENT MAGNITUDE TO IMPROVE SPARK PLUG PERFORMANCE AND DURABILITY

(71) Applicant: Prometheus Applied Technologies, LLC, Fort Collins, CO (US)

(72) Inventors: Luigi P. Tozzi, Fort Collins, CO (US); David Thomas Lepley, Girard, OH (US); Maria Emmanuella Sotiropoulou, Fort Collins, CO (US); Joseph Martin Lepley, Girard, OH (US); Steven B. Pirko, Lake Milton, OH (US)

(73) Assignee: Prometheus Applied Technologies, LLC, Fort Collins, CO (US)

( * ) Notice: Subject to any disclaimer, the term of this patent is extended or adjusted under 35 U.S.C. 154(b) by 350 days.

(21) Appl. No.: 14/028,516

(22) Filed: Sep. 16, 2013

(65) Prior Publication Data
US 2014/0076274 A1 Mar. 20, 2014

Related U.S. Application Data

(60) Provisional application No. 61/702,036, filed on Sep. 17, 2012.

(51) Int. Cl.
*F02P 9/00* (2006.01)
*F02P 13/00* (2006.01)
(Continued)

(52) U.S. Cl.
CPC ............... *F02P 13/00* (2013.01); *F02P 9/002* (2013.01); *H01T 13/20* (2013.01); *H01T 13/467* (2013.01);
(Continued)

(58) Field of Classification Search
CPC . F02B 19/12; F02B 19/06; F02P 9/007; F02P 9/002; F02P 13/00; Y02T 10/125; F02D 15/04; H01T 13/20
(Continued)

(56) References Cited

U.S. PATENT DOCUMENTS 5,555,862 A * 9/1996 Tozzi ...................... H01T 13/54
123/143 B
5,619,959 A * 4/1997 Tozzi ...................... H01T 13/50
123/143 B
(Continued)

FOREIGN PATENT DOCUMENTS

WO 0075505 A1 12/2000
WO 0133056 A1 5/2001

OTHER PUBLICATIONS

PCT International Search Report of International Application No. PCT/US2013/060015 filed on Sep. 16, 2013. 14 Pages.

*Primary Examiner* — Hai H Huynh
*Assistant Examiner* — Gonzalo Laguarda
(74) *Attorney, Agent, or Firm* — Barcelo, Harrison & Walker LLP

(57) ABSTRACT

In certain embodiments, a time-varying spark current ignition system can be applied to improve spark plug ignitability performance and durability as compared to conventional spark ignition systems. Two performance parameters of interest are spark plug life (durability) and spark plug ignitability. In certain embodiments, spark plug life can be extended by applying a spark current amplitude as low as possible without causing quenching of the flame kernel while it is traveling within an electrode gap and/or by applying spark current of a long enough duration to allow the spark/flame kernel to clear a spark plug gap. In certain embodiments, ignitability can be improved by applying a high enough spark current amplitude to sustain the flame kernel once outside the spark plug gap and/or by applying a spark current for long enough to sustain the flame kernel once outside the spark plug gap.

17 Claims, 17 Drawing Sheets

Time varying current profile

(51) Int. Cl.
*H01T 13/20* (2006.01)
*H01T 13/50* (2006.01)
*H01T 13/46* (2006.01)
*F02D 35/02* (2006.01)
*F02B 19/00* (2006.01)
*F02B 19/12* (2006.01)

(52) U.S. Cl.
CPC .............. *H01T 13/50* (2013.01); *F02B 19/00* (2013.01); *F02B 19/12* (2013.01); *F02D 35/023* (2013.01); *F02P 9/007* (2013.01); *Y02T 10/125* (2013.01)

(58) Field of Classification Search
USPC ............ 123/297, 608, 623, 169 G, 169 MG, 123/143 B
See application file for complete search history.

(56) References Cited

U.S. PATENT DOCUMENTS

| | | | | |
|---|---|---|---|---|
| 6,131,555 | A * | 10/2000 | Tozzi et al. | 123/618 |
| 7,100,567 | B1 * | 9/2006 | Bailey et al. | 123/268 |
| 8,857,405 | B2 * | 10/2014 | Attard | 123/261 |
| 2002/0017271 | A1 * | 2/2002 | Suckewer et al. | 123/297 |
| 2006/0219210 | A1 * | 10/2006 | Bailey et al. | 123/259 |

* cited by examiner

Figures 1a-1c Small S/V for an MSP style prechamber spark plug (4 mm$^{-1}$)

Figures 2a – 2c Small S/V for a Dual Bar style spark plug (1.2 mm$^{-1}$)

Figures 3a-3c Large S/V for an annular style spark plug (6.9mm$^{-1}$)

Figures 4a-4c Large S/V for a J-Gap style spark plug (5mm$^{-1}$)

Figures 5a-5c Large S/V for a 3-Prong style spark plug (7.8mm$^{-1}$)

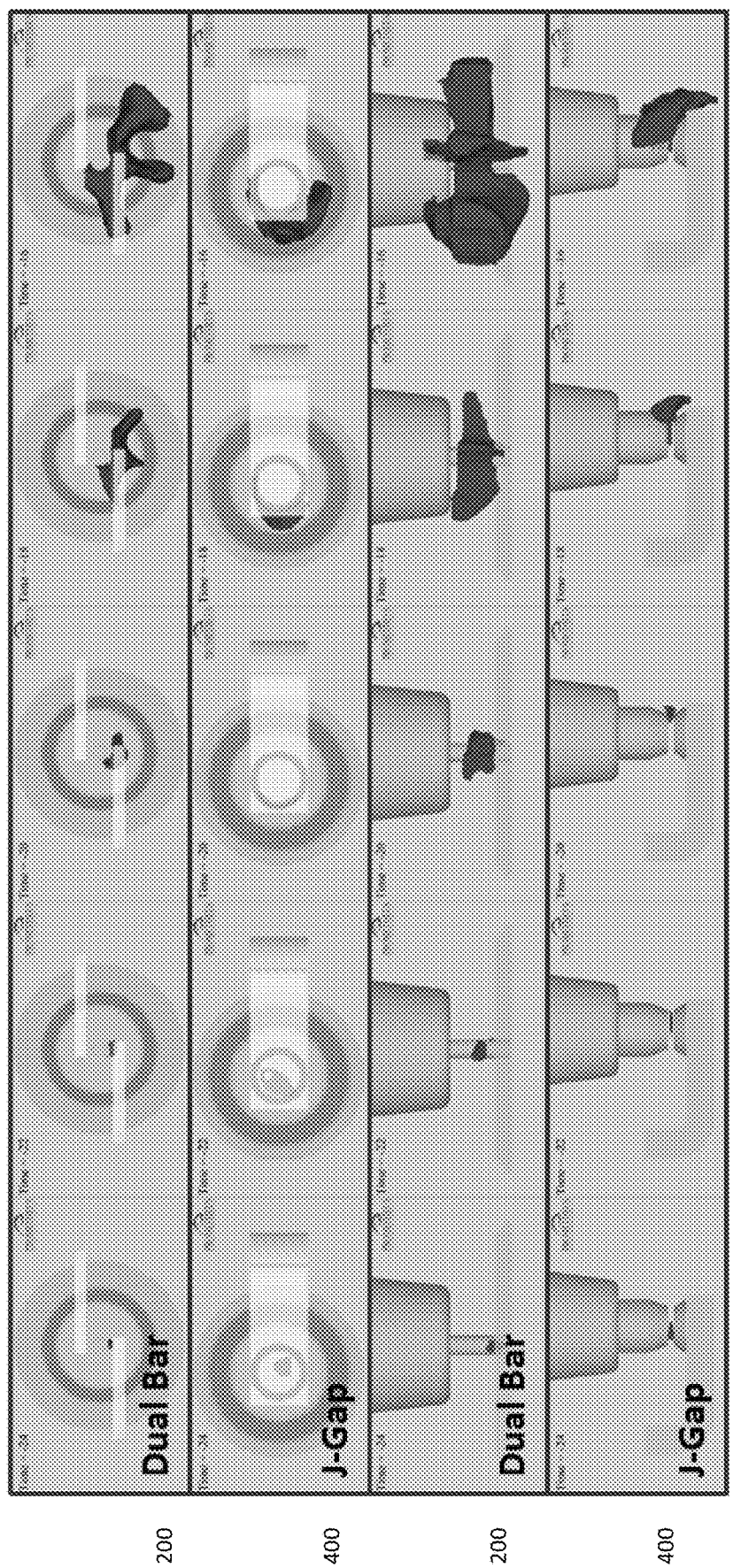
Figure 6 Effect of spark gap electrode geometry on flame kernel development
(Flame front is represented by an isothermal surface of 2000K)

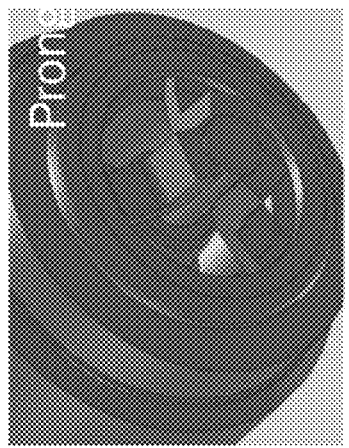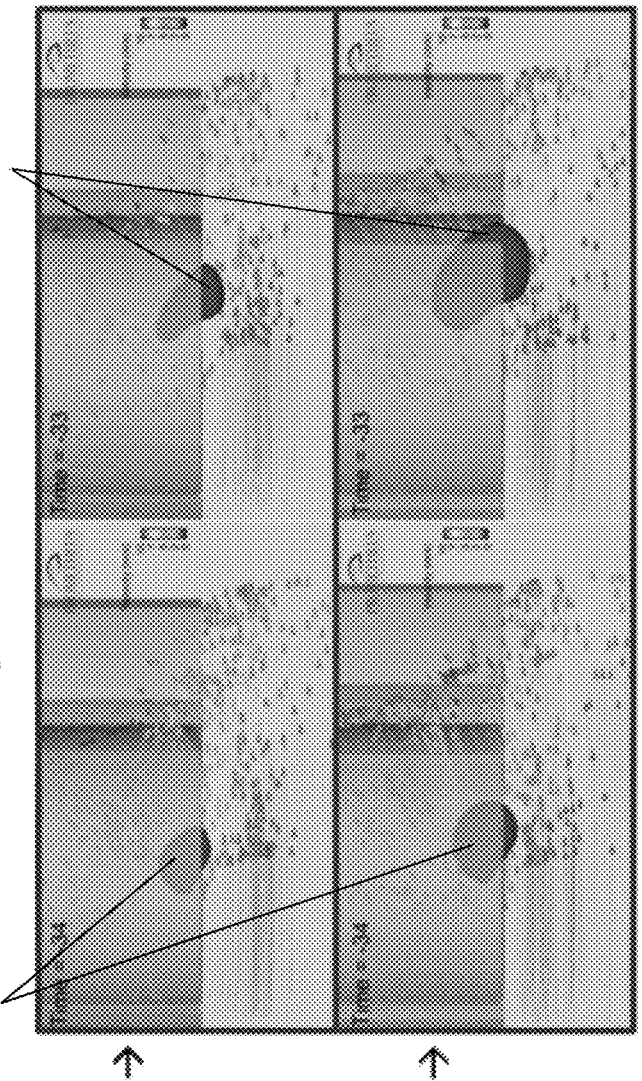
Figures 7a-7b Comparison of flame kernel development for the same plug style with two gap sizes

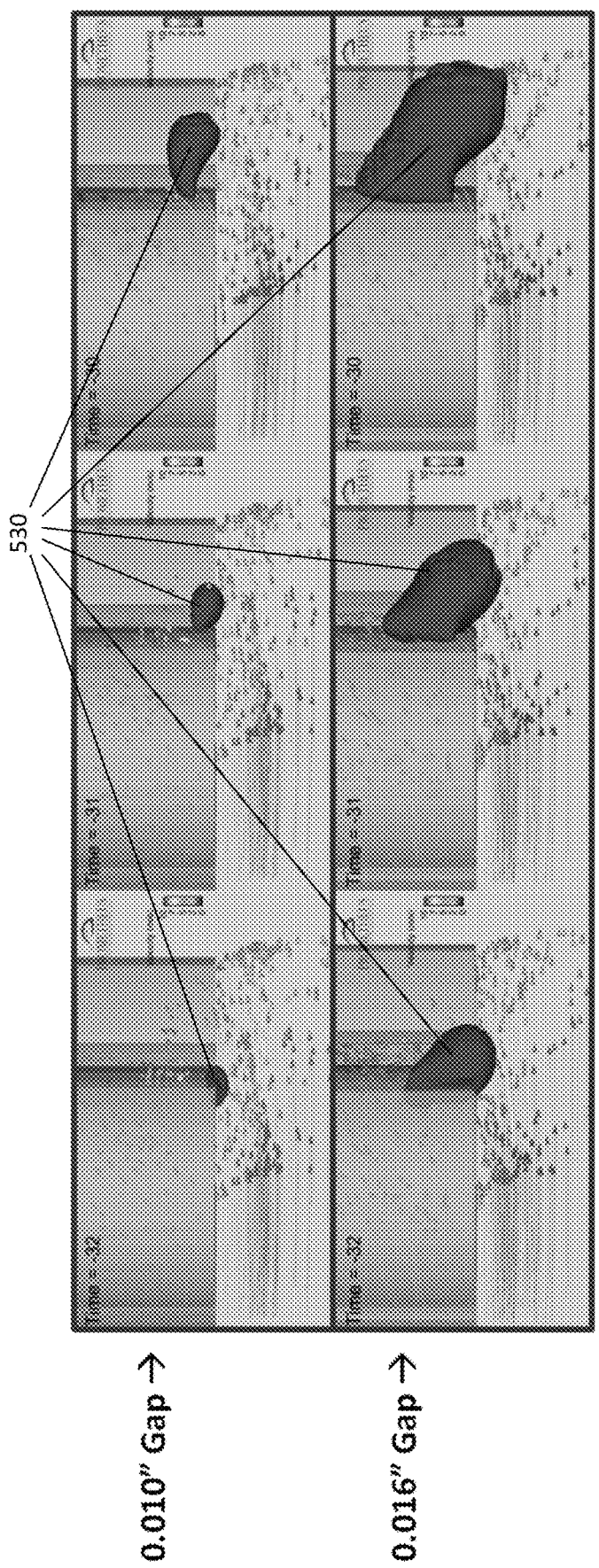
Figure 8 Comparison of flame kernel development for the same plug style with two gap sizes (Flame front is represented by an isothermal surface of 2000K, indicated by the arrow. Vectors represent the flow field present between the electrode gap.)

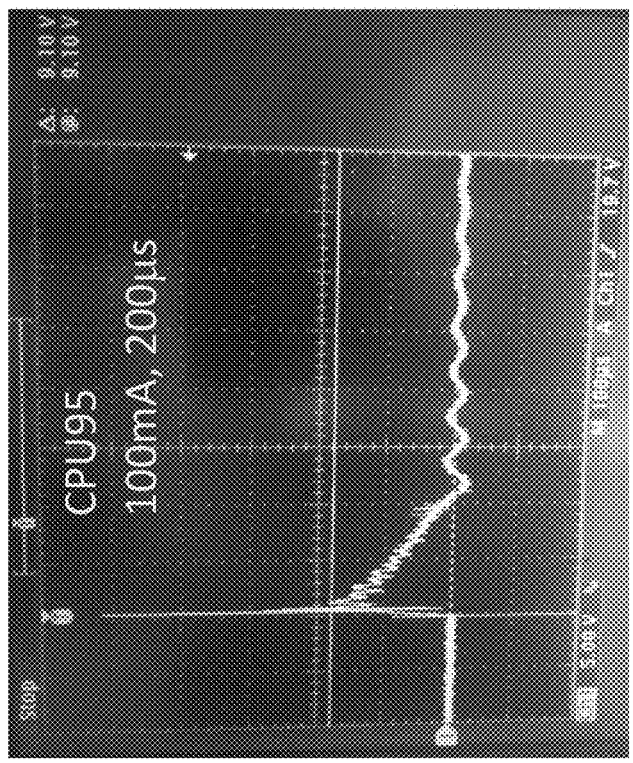
Figure 9 Typical CPU95 spark discharge waveform
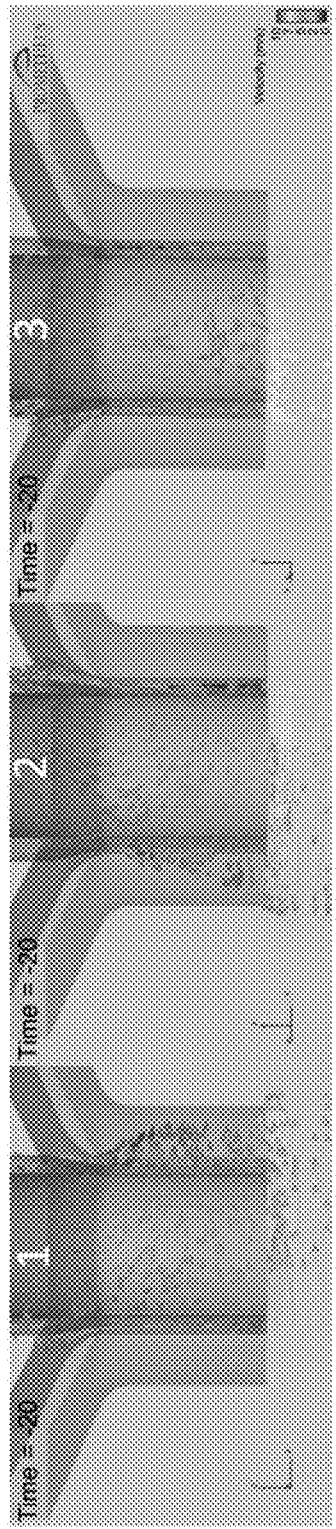
Figure 10 Flow field analysis of the 3-Prong spark plug

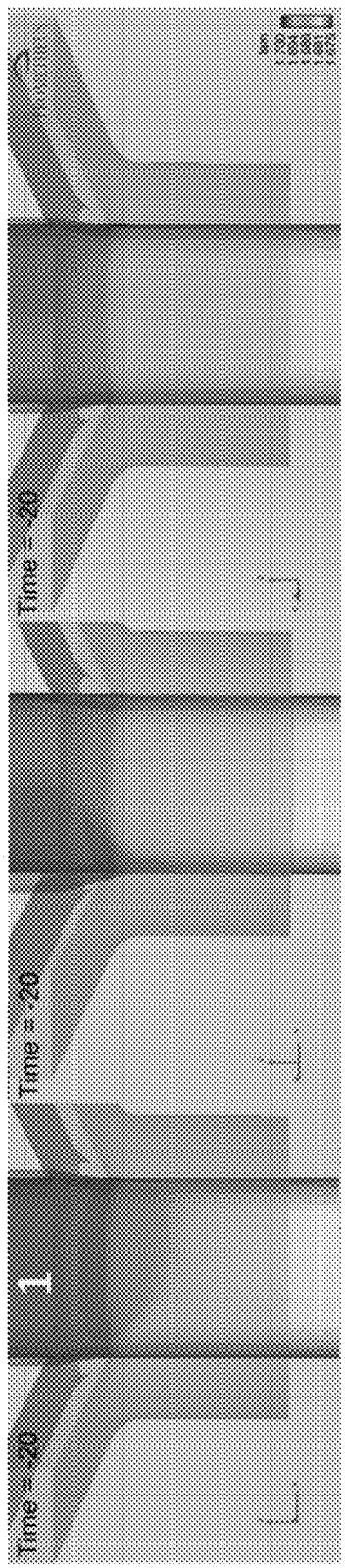
Figure 11 λ distribution of the 3-Prong spark plug
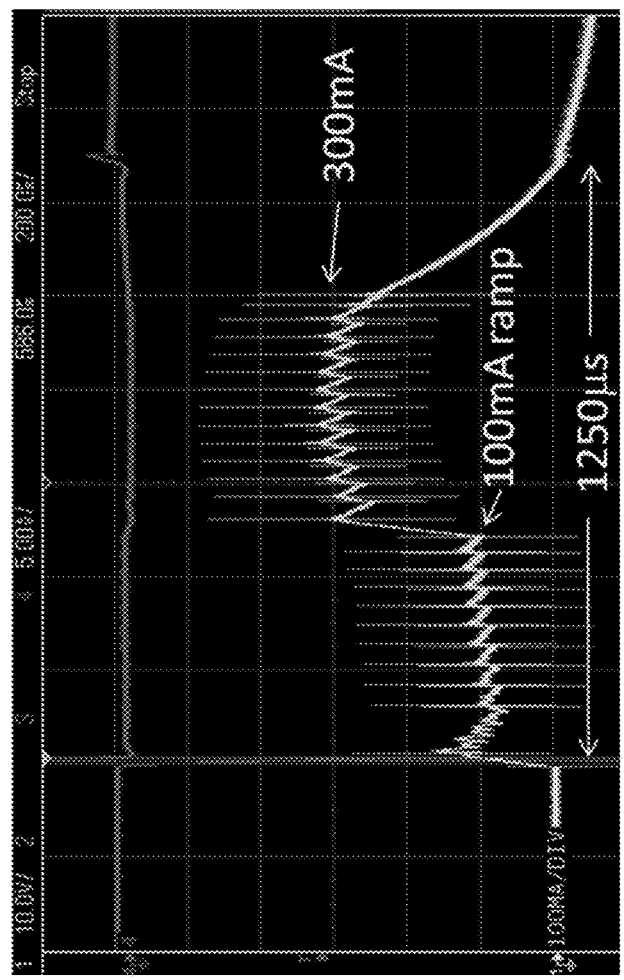
Figure 12 DEIS high energy spark optimized waveform for the application under study

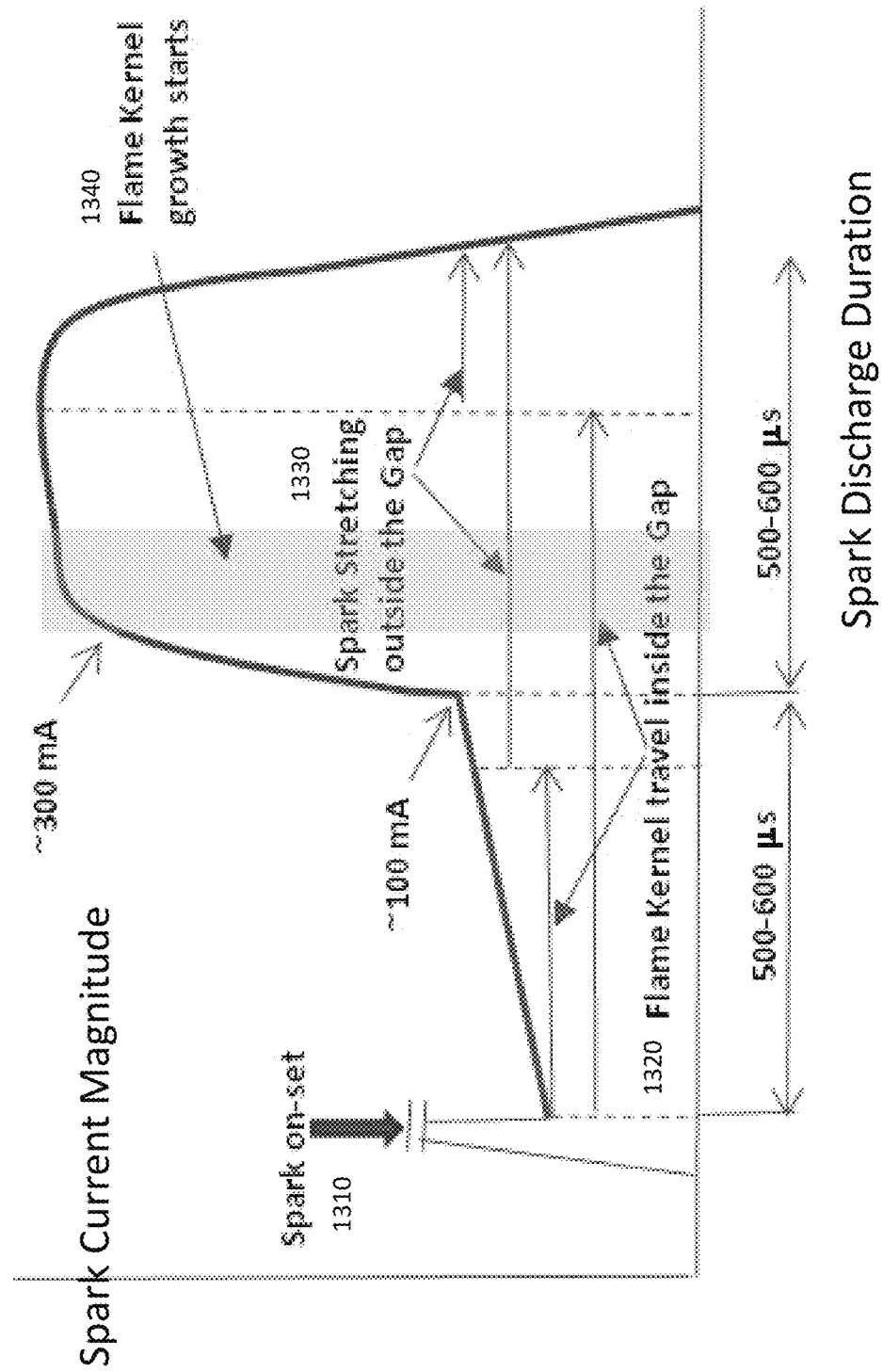
Figure 13 Time varying current profile

Figure 14 Conventional Ignition Systems

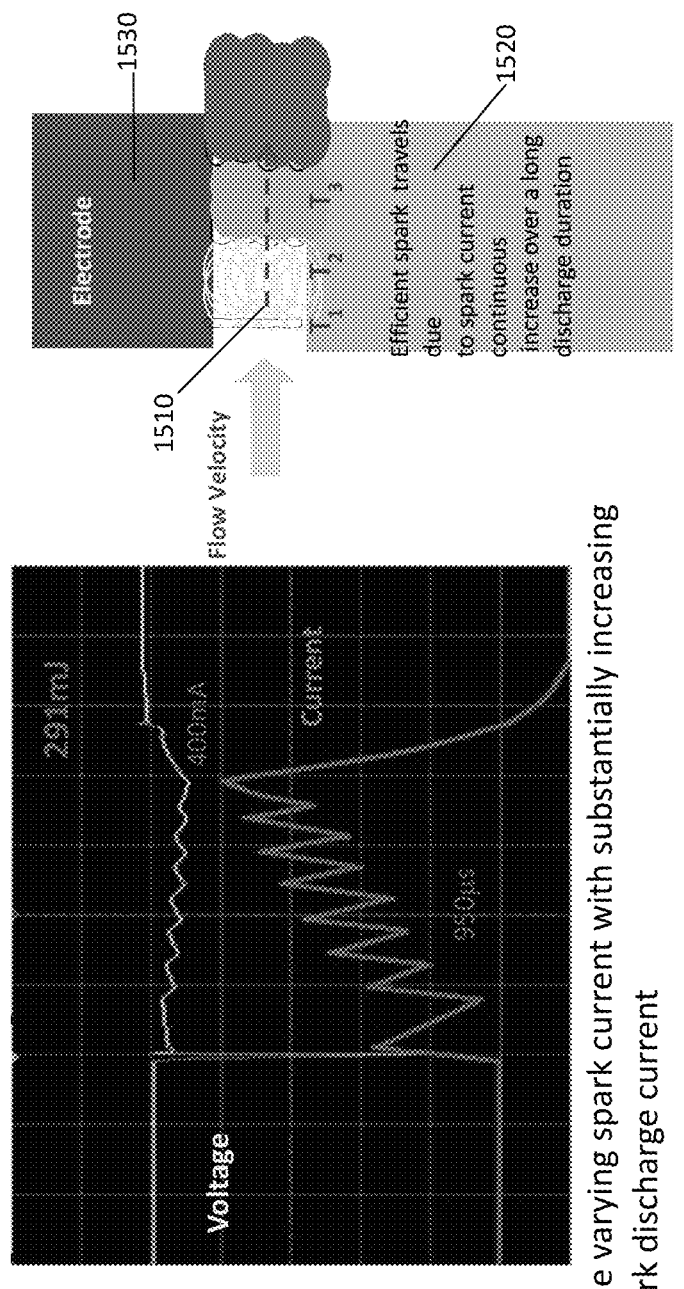
Figure 15 Time Varying Spark Current Ignition System and resulting spark travel

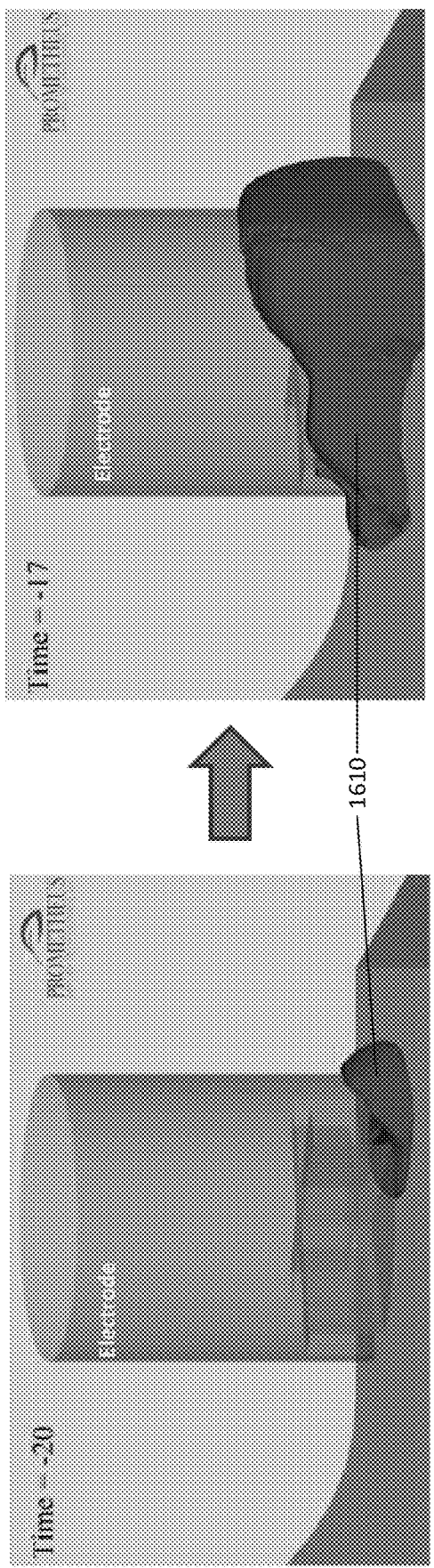
Figure 16 Flame kernel developments with Time Varying Spark Current
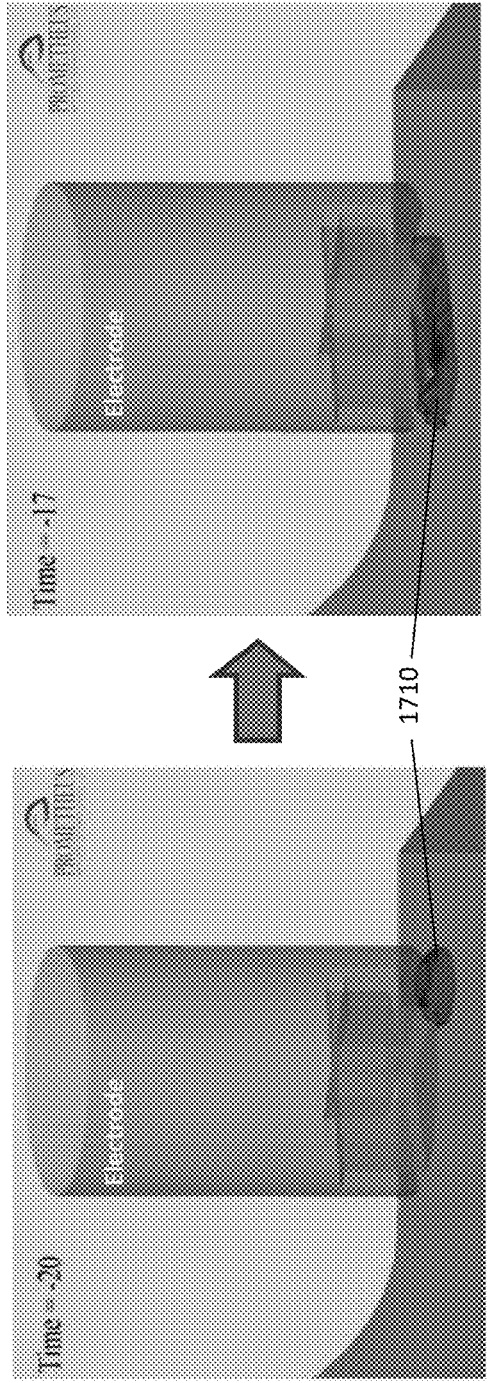
Figure 17 Flame kernel developments with Conventional Spark Current

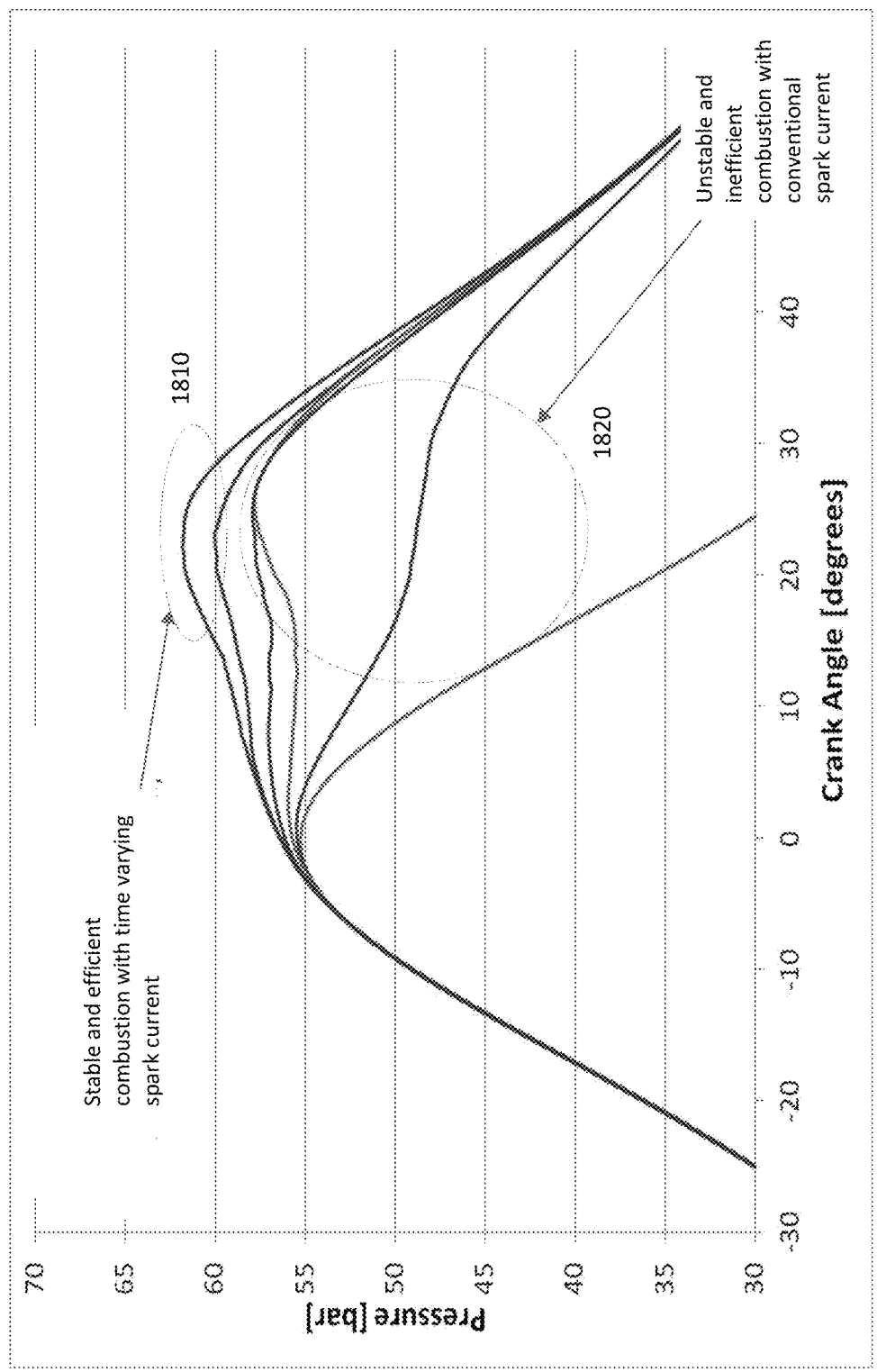
Figure 18 Comparison of combustion pressure curves with time varying spark current and with conventional spark current

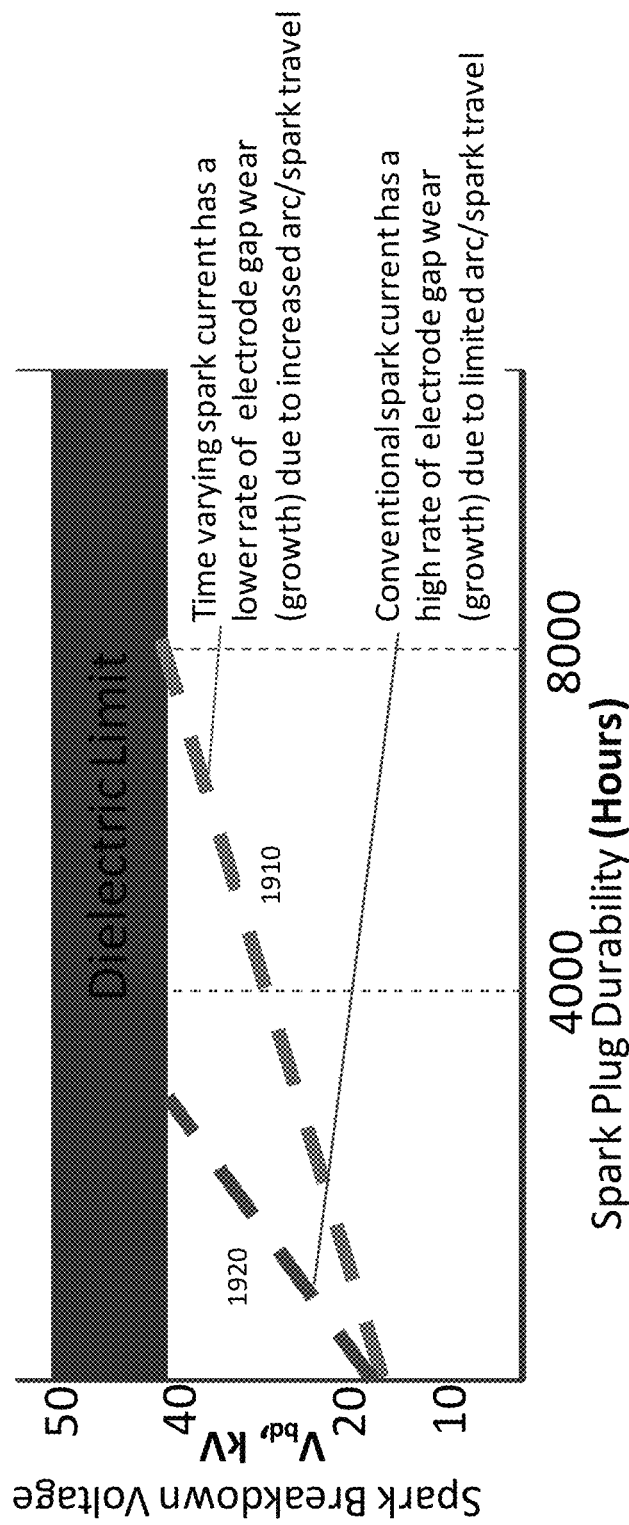
Figure 19 Spark breakdown voltage vs. sprk plug durability comparing time varying spark current with conventional spark current

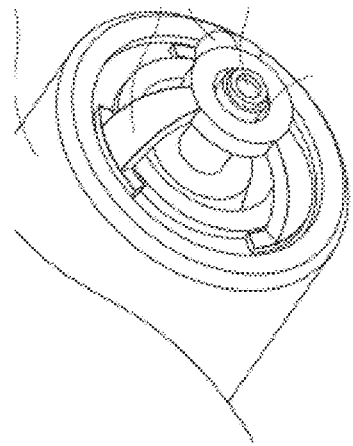
Figure 20c Ring-Gap
Surface / Volume = 6 mm$^{-1}$
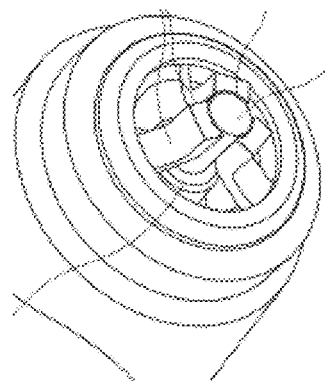
Figure 20b Prong-Gap
Surface / Volume = 8 mm$^{-1}$
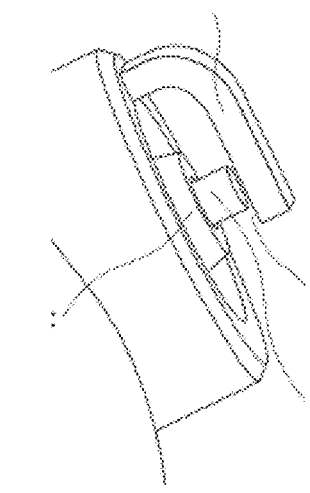
Figure 20a J-Gap
Surface / Volume = 4 mm$^{-1}$
Figure 20a-c Examples of Spark Gaps with Large Surface-to-Volume Ratio

TIME-VARYING SPARK CURRENT MAGNITUDE TO IMPROVE SPARK PLUG PERFORMANCE AND DURABILITY

I. CROSS-REFERENCE TO RELATED APPLICATIONS

This application claims priority of U.S. Patent Application No. 61/702,036, entitled "Time-varying Spark Current Magnitude to Improve Spark Plug Performance and Durability," and filed Sep. 17, 2012; and is related to (1) U.S. patent application Ser. No. 14/020,770, entitled "Two-stage precombustion chamber for large bore gas engines," and filed on Sep. 6, 2013 and International Patent Application Number PCT/US13/58635, entitled "Two-stage precombustion chamber for large bore gas engines," and filed on Sep. 6, 2013, both of which claim priority to U.S. Patent Application No. 61/697,628, entitled "Two-stage precombustion chamber for large bore gas engines," and filed on Sep. 6, 2012; (2) U.S. patent application Ser. No. 13/602,148, entitled "Method and apparatus for achieving high power flame jets while reducing quenching and autoignition in prechamber spark plugs for gas engines," and filed on Sep. 1, 2012 and International Patent Application Number PCT/US2012/53568, entitled "Method and apparatus for achieving high power flame jets while reducing quenching and autoignition in prechamber spark plugs for gas engines," and filed on Sep. 1, 2012, both of which claim priority to U.S. Patent Application No. 61/573,290, entitled "Method and apparatus for achieving high power flame jets while reducing quenching and autoignition in prechamber spark plugs for gas engines," and filed on Sep. 3, 2011; (3) U.S. patent application Ser. No. 13/997,680, entitled "Prechamber Ignition System," and filed on Jun. 25, 2013, which claims priority to International Patent Application Number PCT/US2011/002012, entitled "Prechamber Ignition System," and filed on Dec. 30, 2011, which claims priority to U.S. Patent Application No. 61/460,337, entitled "High efficiency ricochet effect passive chamber spark plug," and filed on Dec. 31, 2010; and (4) U.S. Patent Application No. 61/778,266, entitled "Active Scavenge Prechamber," and filed on Mar. 12, 2013. The entirety of each of the foregoing patent applications is incorporated by reference herein in their entirety.

II. FIELD OF THE INVENTION

The disclosure generally relates to systems and methods for varying a spark current over time to improve spark plug performance and durability.

III. BACKGROUND OF THE INVENTION

There are many different styles of electrode gaps utilized by manufacturers of the industrial spark plugs. Some have claims of better ignitability (less quenching) and others on improved durability (plug life). While many high energy systems may meet ignitability requirements, design trade-offs to obtain this performance may have a negative impact on spark plug life.

There is a need to address the foregoing deficiencies in the art.

IV. BRIEF DESCRIPTION OF THE DRAWINGS

FIG. 6 depicts flame kernel growth sequences for exemplary spark plug gap designs in accordance with certain embodiments.

FIG. 7a depicts an exemplary 3-Prong style spark plug in accordance with certain embodiments.

FIG. 7b depicts sequences of the flame kernel development for the spark plug style of FIG. 7a with two different gap sizes: 0.010" and 0.016" in accordance with certain embodiments.

FIG. 8 depicts sequences of the flame kernel development for the spark plug style of FIG. 7a with for two different gap sizes: 0.010" and 0.016" in accordance with certain embodiments.

FIG. 9 depicts a typical CPU95 (low energy) spark discharge waveform in accordance with certain embodiments.

FIG. 10 depicts the flow field analysis of a 3-Prong spark plug in accordance with certain embodiments.

FIG. 11 depicts λ distribution of the 3-Prong spark plug in accordance with certain embodiments.

FIG. 12 depicts a DEIS high energy spark optimized waveform in accordance with certain embodiments.

FIG. 13 depicts time varying current in accordance with certain embodiments.

Figure 14B:
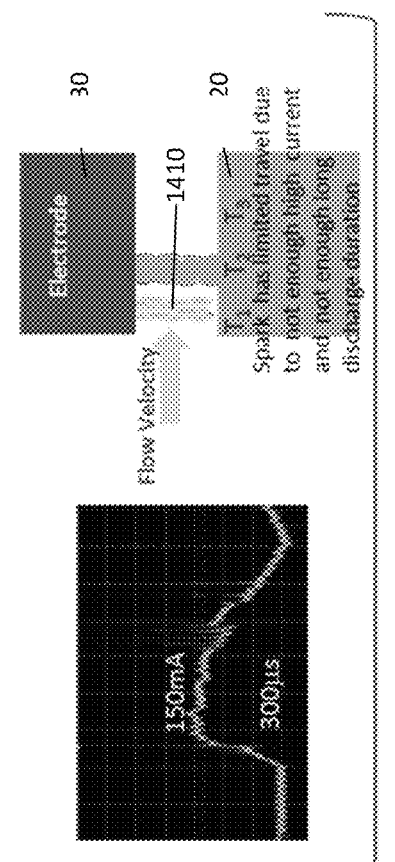
Figure 14A:
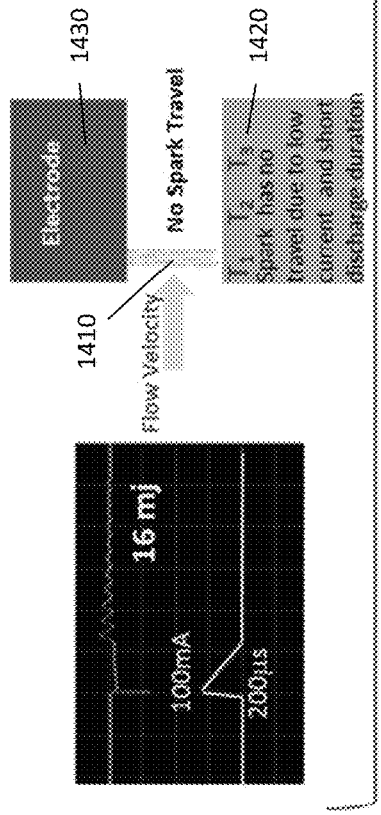

FIGS. 14a-b depict conventional ignition systems have substantially decreasing spark current.

FIG. 15 depicts a time varying spark current ignition system and resulting spark travel in accordance with certain embodiments.

FIG. 16 depicts flame kernel developments with time varying spark current in accordance with certain embodiments.

FIG. 17 depicts flame kernel developments with conventional spark discharge in accordance with certain embodiments.

FIG. 18 depicts a chart comparing combustion pressure curves with time varying spark current and with conventional spark current in accordance with certain embodiments with conventional spark current.

FIG. 19 depicts a spark breakdown voltage vs. spark plug durability comparing time varying spark current and conventional spark current.

FIGS. 20a-20c depict examples of spark gaps with large surface-to-volume ratio in accordance with certain embodiments.

V. DETAILED DESCRIPTION

In certain embodiments, a method of varying spark current is disclosed, comprising: providing a spark plug comprising a primary electrode and one or more ground electrodes offset from the primary electrode to form one or more electrode gaps; disposing the spark plug to dispose the primary electrodes and one or more ground electrodes within a combustion chamber of an internal combustion engine; introducing a flow of fuel-air mixture through the one or more electrode gaps; introducing a spark current across at least one of the one or more electrode gaps to ignite the fuel-air mixture; and increasing the spark current to cause a spark channel to grow. The step of increasing the spark current may comprise increasing the spark current progressively. The step of increasing the spark current may comprise increasing the spark current at a rate approximately proportional to a rate of increase of spark travel. The step of increasing the spark current may comprise increasing the spark current based at least in part on a flow characteristic of fuel-air mixture. The flow characteristic may comprise variations in flow momentum. The step of increasing the spark current may comprise increasing the spark current at a rate approximately proportional to an increase of flow momentum. The step of increasing the spark current may comprise increasing the spark current based at least in part on at least one geometry characteristic of the one or more electrode gaps. The step of increasing the spark current may comprise increasing the spark current at a rate approximately proportional to a variation of surface-to-volume ratio of an electrode gap over a distance traveled by the spark channel. The primary electrode and the one or more ground electrodes may define an electrode surface-to-electrode gap volume ratio of greater than about 3.0 $mm^{-1}$. The one or more electrode gaps may contain a substantially uniform flow of a fuel-air mixture. The substantially uniform flow may have a minimum velocity of about 3 m/s. The method may further comprise: determining an electrode surface temperature; and adjusting the magnitude of the spark current in response to the electrode surface temperature. The method may further comprise: determining a pressure increase in the combustion chamber; and truncating the application of the spark current if the pressure increase exceeds a predetermined threshold. The method may further comprise: determining a flame kernel growth in the electrode gap; and truncating the application of the spark current if the flame kernel growth exceeds a predetermined threshold. The step of increasing the spark current may comprise increasing the spark current from a start of less than about 150 mA to more than about 150 mA, generating a flow velocity in the one or more electrode gaps less than about 3 m/s and wherein the one or more electrode gaps comprise a surface-to-volume ratio greater than about 3 $mm^{-1}$.

In certain embodiments, a pre-combustion chamber spark plug is disclosed comprising: an external surface and an internal surface enclosing a prechamber volume; one or more holes communicating between the external surface and the internal surface for introducing a fuel-air mixture into the prechamber volume; a primary electrode disposed within the prechamber volume; and one or more ground electrodes disposed within the prechamber volume and offset from the primary electrode to form one or more electrode gaps configured for introducing a time-varying spark current across the one or more electrode gaps. The time-varying spark current may comprise a progressively increasing spark current. The time-varying spark current may comprise a spark current that increases at a rate approximately proportional to a rate of increase of spark travel. The time-varying spark current may comprise a spark current that increases based at least in part on a flow characteristic of air or fuel-air mixture. The flow characteristic may comprise variations in flow momentum. The time-varying spark current may comprise a spark current that increases at a rate approximately proportional to an increase of flow momentum. The time-varying spark current may comprise a spark current that increases based at least in part on the geometry characteristics of the electrode spark gap. The time-varying spark current may increase at a rate approximately proportional to a variation of surface-to-volume ratio of an electrode gap over a distance traveled by the spark channel. The primary electrode and the one or more ground electrodes may define an electrode gap surface-to-volume ratio of greater than about 3.0 $mm^{-1}$. The pre-combustion chamber spark plug may further comprise a substantially uniform flow of fuel-air mixture through the one or more electrode spark gaps. The substantially uniform flow may have a minimum velocity of about 3 m/s. The time-varying spark current may vary with time based at least in part on a velocity magnitude of flow of fuel-air mixture through the one or more electrode gaps and electrode gap surface-to-volume ratio. The time-varying spark current may start at less than about 150 mA and may end at more than about 150 mA, a flow velocity in the one or more electrode gaps less than about 3 m/s and electrode gap surface-to-volume ratios greater than 3 $mm^{-1}$. The magnitude of the time-varying spark current may be adjusted in response to the electrode surface temperature. The spark current may be configured to be truncated if the pressure increase exceeds a predetermined threshold. The spark current may be configured to be truncated if the flame kernel growth exceeds a predetermined threshold.

For the purposes of this application, progressively means that the rate of current magnitude increase is proportional to the rate of spark travel increase resulting from the flow momentum, which may be defined as the flow mass density times the flow velocity, acting upon the spark. For example and without limitation, if the spark rate of travel is constant, then the increase in current magnitude may be zero. For example and without limitation, if the spark rate of travel doubles, then the current magnitude may also double.

In certain embodiments, flow characteristics may include variations in flow momentum, which may be defined as the flow mass density times the flow velocity. In certain embodiments, the increase in spark current magnitude may be proportional to the increase of flow momentum. For example and without limitation, if the flow momentum is constant, then the current magnitude also may be constant. For example and without limitation, if the flow momentum doubles, then the magnitude of the current also may double.

In certain embodiments, geometry characteristics may include without limitation the variation of the surface-to-volume ratio of an electrode gap over the distance traveled by the spark. In certain embodiments, the increase in spark current may be proportional to the variation of the surface-to-volume ratio of the electrode gap over the distance traveled by the spark. For example and without limitation, if the surface-to-volume ratio is constant throughout the distance traveled by the spark, then the increase in current magnitude may be zero. For example and without limitation, if the surface-to-volume ratio doubles over the distance traveled by the spark, then the current magnitude also may double.

In certain embodiments, spark plug performance can be improved by applying a time-varying spark current to improve performance and durability as compared to conventional spark plug designs. Two performance parameters of interest are spark plug life and spark plug ignitability. In certain embodiments, spark plug life can be extended by applying a spark current amplitude as low as possible without causing quenching of the flame kernel while it is traveling within a spark plug gap. In certain embodiments, spark plug life can be extended by applying spark current of a long enough duration to allow the spark/flame kernel to clear a spark plug gap. In certain embodiments, ignitability can be improved by applying a high enough spark current amplitude to sustain the flame kernel once outside the spark plug gap. In certain embodiments, ignitability can be improved by applying a spark current for a long enough duration to sustain the flame kernel once outside the spark plug gap.

In certain embodiments, regardless of the electrode shapes a significant factor affecting ignitability is the surface-to-volume ratio (S/V) which is defined as the ratio between the electrode surface area and the volume of the gap confined between said surfaces. In certain embodiments, for the same flame kernel size, the heat losses to the surface of an electrode will increase proportionally with the size of the surface. Following are some examples of electrode gaps, their S/V and how they ultimately affect the flame kernel propagation. In certain embodiments, a S/V may be considered to be small if it is less than or equal to 4 $mm^{-1}$.

Figure 1A:
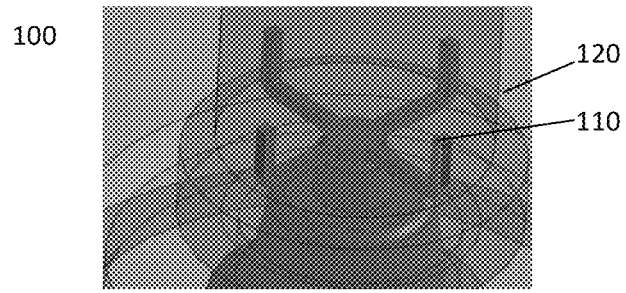
FIGS. 1a-1c depict an exemplary MSP (Multitorch Spark Plug) style spark gap in a spark plug with a small surface-to-volume ratio in accordance with certain embodiments.
Figure 1B:
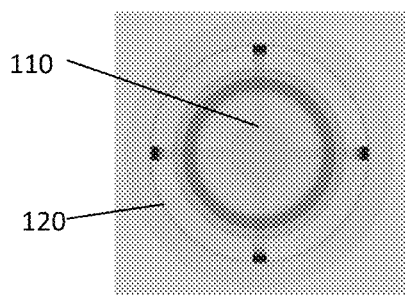
Figure 1C:
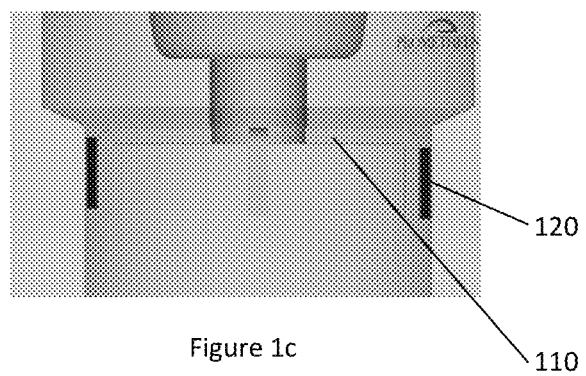
Figure 2A:
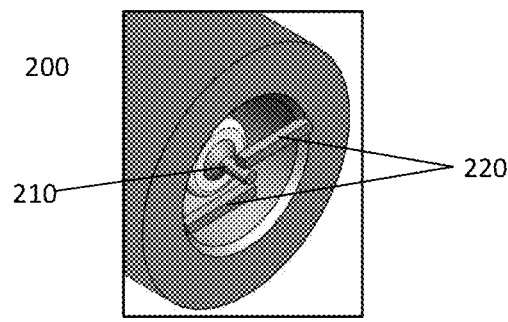
FIGS. 2a-2c depict an exemplary dual bar style spark plug with a small surface-to-volume ratio in accordance with certain embodiments.
Figure 2B:
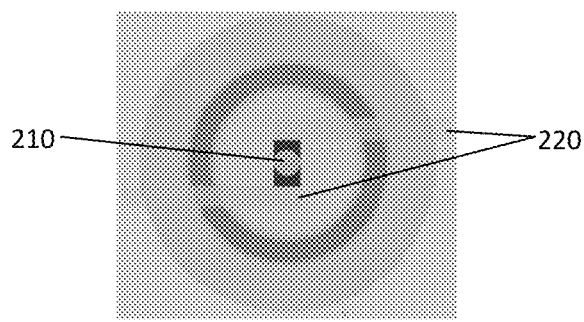
Figure 2C:
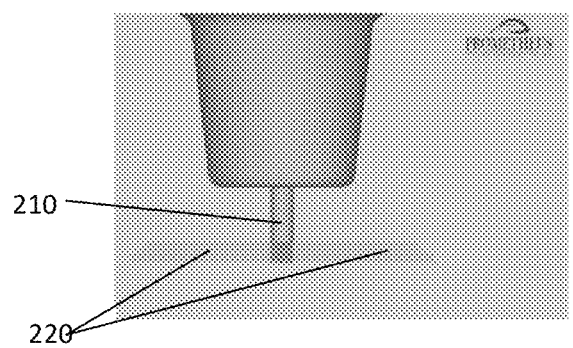

In certain embodiments, the images of FIGS. 1a-1c show the S/V for an MSP (Multitorch Spark Plug) 100 style spark gap in a spark plug. The spark plug geometry is shown in this case because the shell acts as the ground electrode 120. As seen in the images, the center electrodes 110 are very small and spark to the shell. This geometry can be classified as having a small S/V (~4 $mm^{-1}$). In certain embodiments, another exemplary spark plug that has a low S/V electrode geometry is the Dual Bar 200 style spark gap comprising primary electrode 210 and dual bar shaped ground electrodes 220 as shown in FIGS. 2a-2c with approximately 1.2 $mm^{-1}$ S/V.

Figure 3A:
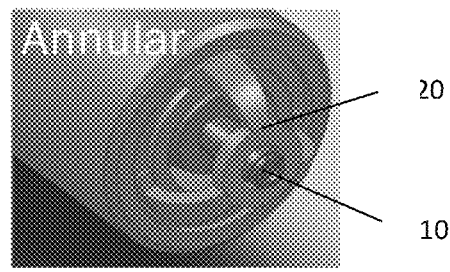
FIGS. 3a-3c depict an exemplary annular style spark plug with a large surface-to-volume ratio in accordance with certain embodiments.
Figure 3B:
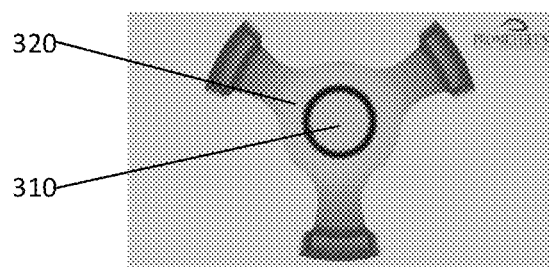
Figure 3C:
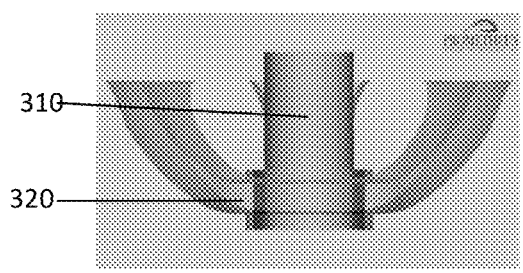
Figures 4A, 4B, 4C:
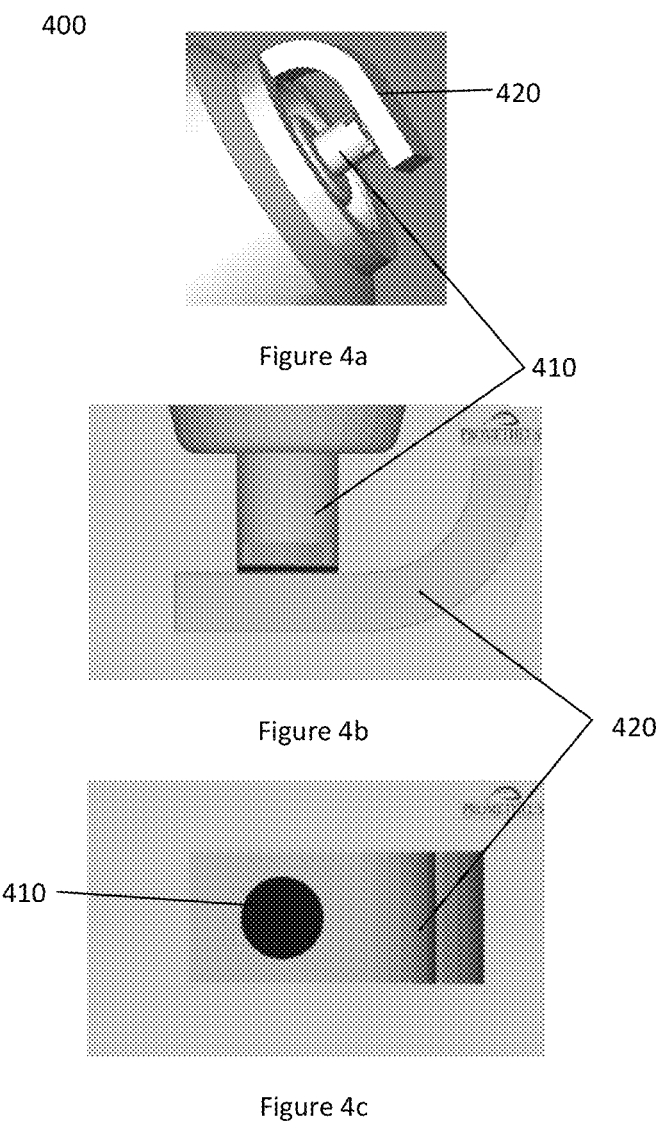
FIGS. 4a-4c depict an exemplary annular style spark plug with a large surface-to-volume ratio in accordance with certain embodiments.
Figure 5A:
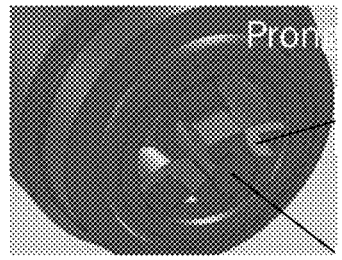
FIGS. 5a-5c depict an exemplary 3-Prong style spark plug with a large surface-to-volume ratio. in accordance with certain embodiments.
Figure 5B:
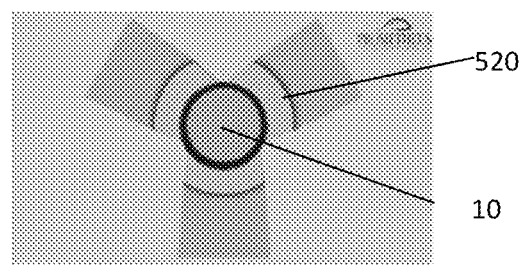
Figure 5C:
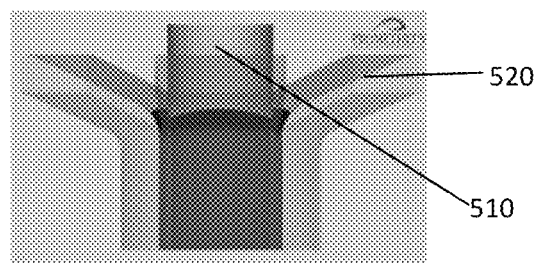

In certain embodiments, examples of electrode gaps with large electrode S/V may include without limitation the annular style gap 300 of FIGS. 3a-c, the particular J-Gap type spark plug 400 of FIGS. 4a-c and the 3-Prong style gap 500 of FIGS. 5a-c. FIGS. 3a-c show primary electrode 310 and annular ground electrode 320. FIGS. 4a-c shows primary electrode 410 and J-shaped ground electrode 420. FIGS. 5a-c show primary electrode 510 and prong-style ground electrodes 520. This J-gap, patented by Denso, also has a cross groove on the cathode (high voltage or primary electrode) which helps in decreasing the S/V of the gap.

In certain embodiments as shown in FIG. 6, combustion simulations of the Dual Bar style electrode 200 and the J-Gap 400 produce results that confirm that the S/V ratios of each design dominate the flame kernel development. FIG. 6 provides the comparison of the flame kernel growth sequence for the two different S/V ratio plug designs. The spark timing and spark energy for both plugs is the same. As expected, the flame kernel of the design with the smaller S/V ratio (in this case, the Dual Bar 200) develops faster since it has less heat loss and more of its energy can go towards flame propagation.

In certain embodiments, to further prove that the results obtained in the sequences shown in FIG. 6 were not influenced by the flow fields or other factors than the S/V, a study was performed by changing the gap size of the same plug style. This in effect changes the S/V of the plug. The plug chosen for this simulation was the 3-Prong 500 style. Shown in FIGS. 7a-b and 8 are the sequences of the flame kernel 530 development with the same spark energy for two different gap sizes: 0.010" and 0.016". The large S/V (7.8 $mm^{-1}$, small gap) has higher heat losses to the electrodes resulting in a slower flame development and a smaller flame kernel 530 size leaving the gap. On the other hand, the larger gap size (S/V=4.9 $mm^{-1}$) has reduced heat losses and improved flame kernel 530 growth rate, allowing for a larger flame kernel 530 size to leave the gap.

In certain embodiments, the general criteria for optimization may involve tailoring the spark waveform for the flow field velocities, λ distribution, and the electrode gap design. In certain embodiments, the spark waveform may be selected to meet certain ignitability and electrode erosion criteria, which may be referred to as the ignitability (performance)/plug life trade-off.

In certain embodiments, for ignitability criteria, the initial flame kernel may move quickly enough within the gap to minimize heat loss, and therefore minimize quenching. To accomplish this, there may be an adequate flow field as well as an adequate spark size to provide the necessary aerodynamic resistance characteristics. In certain embodiments, the spark energy delivery rate may offset the heat losses from the flame kernel to the electrode surfaces.

While many high energy systems could meet the above ignitability requirements, design trade-offs to accomplish this performance could have a negative impact on spark plug life. In certain embodiments, for the purpose of spark optimization, the rate of energy delivered at the spark may be high enough to producing a consistent flame kernel. In certain embodiments, any excess energy delivered at the spark may negatively affect the plug life without providing any benefit.

In certain embodiments, an example process of optimizing a spark waveform for a particular application is displayed. In certain embodiments, it is desirable to develop a spark waveform that will increase combustion stability at leaner air-fuel ratio operation without compromising the wear rate of the electrodes. In certain embodiments, the waveform of FIG. 9 may be used, which may be the standard CPU95 (low energy) spark discharge. In certain embodiments, a higher energy with sufficient time to travel (long duration) will satisfy the desired characteristics. The programmable, high energy DEIS may be used to generate the required spark waveform.

In certain embodiments, the flow fields at the electrode gap of the spark plug used in the application may be studied to determine the shape of the waveform. In certain embodiments, the 3-Prong style gap 500 may be used. CFD simulations may be conducted using the engine geometry and settings that are specific to the particular application. The flow fields for the three different gaps are shown in FIG. 10. They may be similar to what was observed in the simulation results discussed above. The flow varies for each ground electrode in both magnitude and direction.

In certain embodiments, inspection of the λ distribution for each electrode gap may show a relatively similar distribution in all three gaps as shown in FIG. 11. In certain embodiments, the flame kernel development variability may be mostly a function of the flow fields at the electrode gaps.

In certain embodiments, the waveform may be tailored so that it will produce a spark large enough to move with the flow fields having magnitudes of approximately 1-5 m/s. In certain embodiments, the spark waveform may be long enough to travel the distance of the electrode surfaces. In certain embodiments in which the flame kernel may be traveling towards the core-nose, the mixture distribution may be rich enough to prevent quenching. The flame kernel may develop more slowly than other spark locations, but this may be inherent to the selected plug and flow fields specific to this application.

In certain embodiments, the waveform shown in FIG. 12 may be used. It may be the optimum waveform for a particular application based on the above outlined requirements. The current amplitude may be high enough (100-300 mA) to produce a large diameter plasma column that will move with the flow. The duration may be long enough (1250 µs) to allow for the flame kernel engulfing the spark to escape from the electrode gap. In certain embodiments, the energy delivery profile may be such as to sustain the flame kernel development without compromising the electrode erosion wear (plug life).

In certain embodiments, spark discharge can be varied to produce consistent flame kernel development. In certain embodiments, a spark waveform optimization process may follow the following steps:
 a. Define application requirements and restraints
 b. Study the flow fields and λ distribution of the electrode gap
 c. Use a programmable, high energy DC, ignition system to tailor the spark to meet the requirements of flow fields and mixture distributions
 d. Design a spark waveform that optimizes the ignitability/plug life trade-off In certain embodiments, the spark current may be varied over time as shown in FIG. 13. After spark onset 1310 the spark current can be increased linearly for approximately 500-600 µs to a spark current of approximately 100 mA at which point the rate of increase in spark current can be increased. As indicated at 1320, the flame kernel will initially travel insider the gap and then when it reaches the edge of the gap, the spark will stretch outside the gap as shown at 1330. As indicated by grey bar 1340, once flame kernel growth commences, the rate of increase of spark current may be reduced. One of skill in the art will recognize that a variety of time-variable spark current profiles are possible without departing from the scope of the current invention.

As shown in FIGS. 14a-b, conventional ignition systems have substantially decreasing spark current. For example as shown in FIG. 14a, a conventional ignition system may have a spark current profile that peaks and 100 mA at spark initiation and decreases linearly to zero within 200 µs thereafter. The spark 1410 may be created between primary electrode 1420 and ground electrode 1430, but the spark may not travel along the electrode gap due to low current and short discharge duration. FIG. 14b displays another conventional spark current profile with slightly higher peak current of 150 mA and spark duration of approximately 300 µs before the spark current returns to zero and the spark ceases. The spark 1410 may be created at $T_1$ between primary electrode 1420 and ground electrode 1430, but the spark 1410 may have limited travel from $T_1$ (yellow) to $T_2$ (orange) due to insufficient current and discharge duration.

In certain embodiments, a time-varying spark current ignition system can be used to increase spark plug performance. A time-varying spark current ignition system may be used with a conventional spark plug or with a prechamber spark plug as described in copending U.S. patent application Ser. No. 13/602,148, entitled "Method and apparatus for achieving high power flame jets while reducing quenching and autoignition in prechamber spark plugs for gas engines," and filed on Sep. 1, 2012; U.S. patent application Ser. No. 13/997,680, entitled "Prechamber Ignition System," and filed on Jun. 25, 2013; and U.S. Patent Application No. 61/778,266, entitled "Active Scavenge Prechamber," and filed on Mar. 12, 2013, all of which are incorporated herein by reference in their entirety. As shown in FIG. 15, a time-varying spark current may have substantially increasing spark current that may generate an efficient spark that traveled due to the continuous increase in spark current over a long duration as shown. In certain embodiments, a spark 1510 is generated between primary electrode 1520 and ground electrode 1530 and may travel as shown from $T_1$ (yellow) to $T_2$ (orange) to $T_3$ (red).

In certain embodiments as shown in FIG. 16, the use of a time-varying spark current profile may generate a much stronger flame kernel 1610 growth when compared to a conventional spark discharge as shown in FIG. 17, which results in substantially smaller flame kernel 1710 growth.

In certain embodiments as shown in FIG. 18, use of a time varying spark current profile may result in stable and efficient combustion as indicated at region 1810 of FIG. 18, whereas use of a conventional spark current profile may result in unstable and inefficient combustion as indicated at region 1820 of FIG. 18.

In certain embodiments as shown in FIG. 19, use of a time varying spark current profile represented by the dotted green line 1910 may exhibit a lower rate of electrode gap growth due to spark (or arc) travel. In contrast, a conventional spark current profile represented by the dotted red line 1920 may have a high rate of electrode gap growth due to the stationary arc (or spark). As a result, the use of a time-varying spark current profile may result in significantly enhanced spark plug durability as shown in FIG. 19. One of skill in the art will recognize that in the context of spark or arc travel the terms arc and spark can be interchanged.

One or skill in the art will recognize that the forgoing systems and methods can be used with a variety of spark gap configurations, including but not limited to the large surface-to-volume ratio configurations shown in FIGS. 20a-c.

While the above description contains many specifics and certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those ordinarily skilled in the art, as mentioned above. The invention includes any combination or subcombination of the elements from the different species and/or embodiments disclosed herein.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit, and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

We claim:

1. A method of varying spark current, comprising:
 providing a spark plug comprising a primary electrode and one or more ground electrodes offset from the primary electrode to form one or more electrode gaps;
 disposing the spark plug to dispose the primary electrode and one or more ground electrodes within a combustion chamber of an internal combustion engine;
 introducing a flow of fuel-air mixture through the one or more electrode gaps;

introducing a spark current across at least one of the one or more electrode gaps to ignite the fuel-air mixture; and after spark onset increasing the spark current at a rate approximately proportional to a variation of surface-to-volume ratio of an electrode gap over a distance traveled by the spark channel to cause a spark channel to grow in diameter according to flow of fuel-air mixture within the one or more electrode gaps and the spark channel to move onto surfaces of the one or more electrode gaps;

wherein the step of increasing the spark current comprises increasing the spark current from a start of less than about 150 mA to more than about 150 mA, generating a flow velocity in the one or more electrode gaps greater than about 3 m/s and wherein the one or more electrode gaps comprise a surface-to-volume ratio greater than about 3 $mm^{-1}$; and wherein the spark current is varied according to known flow momentum in the one or more electrode gaps to grow the spark channel diameter and to generate aerodynamic forces, acting upon the spark channel, and sufficient to achieve proper spark channel travel during spark discharge.

2. The method of claim 1, wherein the step of increasing the spark current comprises increasing the spark current progressively.

3. The method of claim 2, wherein the step of increasing the spark current comprises increasing the spark current at a rate approximately proportional to a rate of increase of spark travel.

4. The method of claim 1, wherein the step of increasing the spark current comprises increasing the spark current based at least in part on at least one geometry characteristic of the one or more electrode gaps.

5. The method of claim 1, wherein the one or more electrode gaps contain a substantially uniform flow of a fuel-air mixture.

6. The method of claim 1, further comprising:
determining an electrode surface temperature; and
adjusting the magnitude of the spark current in response to the electrode surface temperature.

7. The method of claim 1, further comprising:
determining a pressure increase in the combustion chamber; and
truncating the application of the spark current if the pressure increase exceeds a predetermined threshold.

8. The method of claim 1, further comprising:
determining a flame kernel growth in the electrode gap; and
truncating the application of the spark current if the flame kernel growth exceeds a predetermined threshold.

9. A pre-combustion chamber spark plug comprising:
an external surface and an internal surface enclosing a prechamber volume;
one or more holes communicating between the external surface and the internal surface for introducing a fuel-air mixture into the prechamber volume;
a primary electrode disposed within the prechamber volume; and
one or more ground electrodes disposed within the prechamber volume and offset from the primary electrode to form one or more electrode gaps configured for introducing a time-varying spark current across the one or more electrode gaps and increasing the spark current after spark onset at a rate approximately proportional to a variation of surface-to-volume ratio of an electrode gap over a distance traveled by the spark channel to cause a spark channel to grow in diameter according to flow of fuel-air mixture within the one or more electrode gaps and the spark channel to move onto surfaces of the one or more electrode gaps;

wherein the spark current is increased from a start of less than about 150 mA to more than about 150 mA, generating a flow velocity in the one or more electrode gaps greater than about 3 m/s and wherein the one or more electrode gaps comprise a surface-to-volume ratio greater than about 3 $mm^{-1}$; and wherein the spark current is varied according to known flow momentum in the one or more electrode gaps, to grow the spark channel diameter and to generate aerodynamic forces, acting upon the spark channel, and sufficient to achieve proper spark channel travel during spark discharge.

10. The pre-combustion chamber spark plug of claim 9, wherein the time-varying spark current comprises a progressively increasing spark current.

11. The pre-combustion chamber spark plug of claim 9, wherein the time-varying spark current comprises a spark current that increases at a rate approximately proportional to a rate of increase of spark travel.

12. The pre-combustion chamber spark plug of claim 9, wherein the time-varying spark current comprises a spark current that increases based at least in part on the geometry characteristics of the electrode spark gap.

13. The pre-combustion chamber spark plug of claim 9, further comprising a substantially uniform flow of fuel-air mixture through the one or more electrode gaps.

14. The pre-combustion chamber spark plug of claim 9, wherein the time-varying spark current varies with time based at least in part on a velocity magnitude of flow of fuel-air mixture through the one or more electrode gaps and electrode gap surface-to-volume ratio.

15. The pre-combustion chamber spark plug of claim 9, wherein the magnitude of the time-varying spark current is adjusted in response to the electrode surface temperature.

16. The pre-combustion chamber spark plug of claim 9, wherein the spark current is configured to be truncated if the pressure increase exceeds a predetermined threshold.

17. The pre-combustion chamber spark plug of claim 9, wherein the spark current is configured to be truncated if flame kernel growth exceeds a predetermined threshold.

* * * * *